US011025089B2

(12) United States Patent
Münz et al.

(10) Patent No.: US 11,025,089 B2
(45) Date of Patent: Jun. 1, 2021

(54) DISTRIBUTED ENERGY RESOURCE MANAGEMENT SYSTEM

(71) Applicant: Siemens Aktiengesellschaft, Munich (DE)

(72) Inventors: Ulrich Münz, Plainsboro, NJ (US); Xiaofan Wu, North Brunswick, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 10 days.

(21) Appl. No.: 16/555,002

(22) Filed: Aug. 29, 2019

(65) Prior Publication Data
US 2020/0153274 A1    May 14, 2020

Related U.S. Application Data

(60) Provisional application No. 62/760,087, filed on Nov. 13, 2018.

(51) Int. Cl.
*H02J 13/00* (2006.01)
*G05B 19/042* (2006.01)
(Continued)

(52) U.S. Cl.
CPC ........ *H02J 13/0017* (2013.01); *G05B 19/042* (2013.01); *H02J 3/32* (2013.01); *H02J 3/383* (2013.01); *G05B 2219/2639* (2013.01)

(58) Field of Classification Search
CPC .......... H02J 13/0017; H02J 3/32; H02J 3/383; H02J 3/001; H02J 2310/10; H02J 2203/10;
(Continued)

(56) References Cited

U.S. PATENT DOCUMENTS

2010/0198420 A1* 8/2010 Rettger ................ H02S 10/00
                                                             700/291
2013/0106196 A1* 5/2013 Johnson ................ H02J 3/50
                                                             307/82
(Continued)

FOREIGN PATENT DOCUMENTS

AU        2015280694 A1    2/2017

*Primary Examiner* — Kenneth M Lo
*Assistant Examiner* — Mohammed Shafayet

(57) ABSTRACT

A power distribution and control system for use with a bulk generation system having transmission and distribution systems, the power distribution and control system including a plurality of microgrids each including a power generation element and a load, a plurality of microgrid controllers each associated with one and only one of the plurality of microgrids, and a first communication network. A high-level controller is operable using the first communication network to communicate with the bulk generation system and each of the plurality of microgrid controllers, the high-level controller operable to coordinate the operation of the microgrids during normal system operation. A second communication network is separate from the first communication network, the second communication network providing peer to peer communication between each of the plurality of microgrid controllers when at least one of the high-level controller and the first communication network is not available, and a plurality of third communication networks provide communication between one of the plurality of microgrid controllers and at least one of the power generation element and the load associated with that microgrid controller.

11 Claims, 2 Drawing Sheets

(51) Int. Cl.
*H02J 3/32* (2006.01)
*H02J 3/38* (2006.01)

(58) Field of Classification Search
CPC ............ H02J 2300/40; H02J 13/00004; H02J 13/00006; H02J 13/00034; H02J 3/381; G05B 19/042; G05B 2219/2639; Y02B 90/20; Y04S 20/12; Y04S 40/12; Y02E 10/56; Y02E 60/7807; Y02E 60/00
USPC .......................................................... 700/295
See application file for complete search history.

(56) References Cited

U.S. PATENT DOCUMENTS

| | | | |
|---|---|---|---|
| 2015/0134130 A1* | 5/2015 | Carralero | G06F 1/26 700/286 |
| 2015/0134135 A1* | 5/2015 | Wong | H02J 3/381 700/295 |
| 2015/0202976 A1* | 7/2015 | Bridges | B60L 53/665 320/109 |
| 2015/0288183 A1* | 10/2015 | Villanueva, Jr. | H02J 3/005 700/291 |
| 2016/0352208 A1* | 12/2016 | Wien | H02M 1/0845 |
| 2018/0048150 A1 | 2/2018 | Frasher | |

\* cited by examiner

DISTRIBUTED ENERGY RESOURCE MANAGEMENT SYSTEM

TECHNICAL FIELD

The present disclosure is directed, in general, to a control system for an electrical grid, and more specifically to a control system for an electrical grid including one or more microgrids.

BACKGROUND

Large scale power outages can be caused by natural events such as earthquakes, fires, or weather. Some areas of the world are therefore more susceptible to periodic large-scale outages, especially in areas that are regularly affected by hurricanes or similarly destructive weather events (e.g. United States east coast). The increased connectivity between energy system components and the internet can also increase the risk of outages due to cyber-attacks or other malicious activity.

SUMMARY

A power distribution and control system for use with a bulk generation system having transmission and distribution systems, the power distribution and control system including a plurality of microgrids each including a power generation element and a load, a plurality of microgrid controllers each associated with one and only one of the plurality of microgrids, and a first communication network. A high-level controller is operable using the first communication network to communicate with the bulk generation system and each of the plurality of microgrid controllers, the high-level controller operable to coordinate the operation of the microgrids during normal system operation. A second communication network is separate from the first communication network, the second communication network providing peer to peer communication between each of the plurality of microgrid controllers when at least one of the high-level controller and the first communication network is not available, and a plurality of third communication networks provide communication between one of the plurality of microgrid controllers and at least one of the power generation element and the load associated with that microgrid controller.

In another construction, a method of operating a power distribution and control system for use with a bulk generation system having transmission and distribution systems during a contingency event includes operating a high-level controller to gather data from an external database, a plurality of microgrid controllers, and the bulk generation system via a first communication network, and using data from the external database to predict the effects on the power distribution and control system of a contingency and to determine possible changes to the power distribution and control system to mitigate those effects. The method further includes implementing a portion of the possible changes with direction from the high-level controller via the first communication network, activating a second communication network in response to the contingency at least partially disabling the first communication network, the second communication network including peer to peer communication between each of the plurality of microgrid controllers, and establishing an energy management system using the second communication network to optimize the generation and distribution of power by and between the microgrids.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
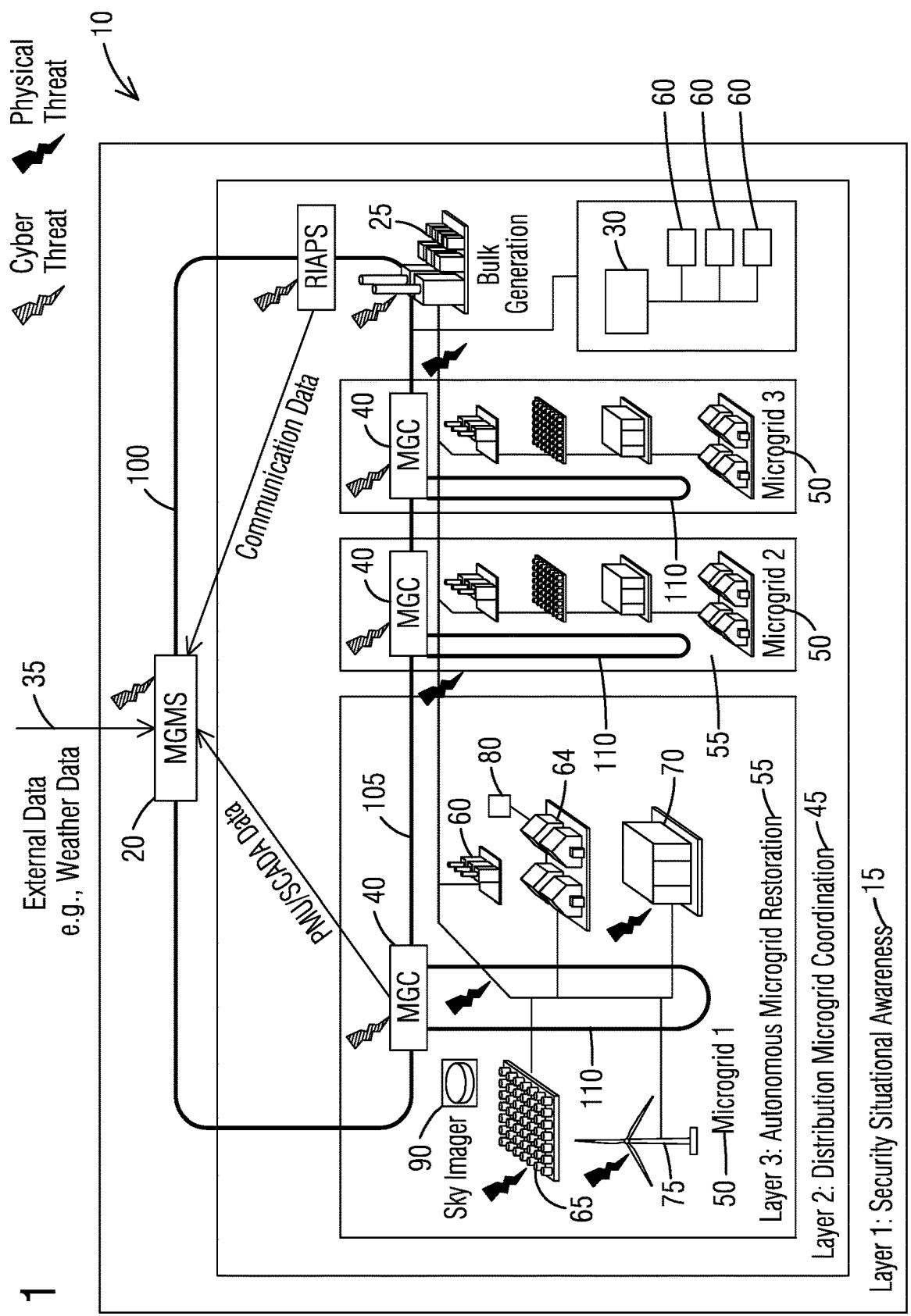
FIG. 1 is a schematic illustration of a power distribution and control system for use with a bulk generation system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

Current power systems, and particularly those in fully developed areas such as the United States are based on large centralized generation with very high voltage transmission via high voltage power lines to substations. The substations step the voltage down to an intermediate voltage and then distribute the power to large transformers via intermediate voltage power lines. In some cases, these intermediate voltage lines are buried underground but, in many cases, they are strung overhead via power poles. The large transformers further step the voltage down to a level suitable for use, and deliver that power to the various users. Of course, additional transformers, substations, or levels of transmission and distribution can be included in a particular system.

The large centralized generation is generally provided by large power generation units that may employ nuclear, fossil, hydro, etc. as a power source. Each of these power generation units feed power into the very high voltage transmission system to define a power grid. In the United States, the power grid extends across the North American continent to allow for the movement of large quantities of power from the centralized generation locations to the locations where it is needed.

The power plants employed in the large centralized generation often include large rotating generators driven by steam, gas, or hydro turbines. This large rotating inertia allows the grid to maintain very accurate control of the output frequency and voltage. In addition, the power system is well-suited to the control of power factor and reactive power. Centralized hierarchical control structures are used to control the power generation and the distribution with little to no feedback from the distribution level or from the power plants. In addition, the centralized control assures that sufficient capacity (e.g., spinning reserve, MW margin, etc.) is maintained to allow for sudden load changes on the system without significant changes in the voltage or frequency.

When initially designed and built, the current power system did not include significant wind power, solar generation, or energy storage, and the load comprised mostly passive loads (i.e., mainly resistance, capacitance, and inductance elements) as opposed to more active loads (i.e., transistors, semiconductors, amplifiers, etc.).

A significant weakness of the centralized power generation arrangement is the lines required to transmit and distribute the power. These lines are often several miles (hundreds of miles) long and are susceptible to damage due to weather or other conditions (e.g., solar activity). In addition, the centralized control is susceptible to cyberattacks as a single attack can affect a large portion of the power system. If a significant power line is damaged or destroyed, it can cut power to several substations and tens of thousands of users. Similarly, a single successful cyberattack could shut down or damage a significant portion of the entire power generation system also preventing power delivery to tens of thousands of users.

Damage or destruction of power lines in the transmission or distribution systems typically leads directly to an outage in the distribution system and at user locations. To provide resiliency and protect against power loss, previous systems relied heavily on conventional generation close to critical loads such as back-up diesel or gas generators that can be used during emergency situations. Often, critical loads such as hospitals and police stations include local generation that provides the desired resilience.

In addition to the operational difficulties just discussed, the recent addition of significant distributed energy resources (DERs), typically in the form of wind power, solar power, or energy storage has increased the difficulty of controlling the entire system. The operation of these distributed generation systems is intermittent and can be unpredictable. For example, power input from wind generation assets may be desired at times when the wind does not blow, or solar power may be needed at night or during days with variable cloudiness making the amount of power available inconsistent. Furthermore, these generation assets may not be capable of aiding in voltage regulation, frequency regulation, or power factor regulation.

Energy storage systems draw power from the system when power is available and are capable of delivering power to the system when necessary. However, the status of the energy storage system may not always be known or at a level required such that energy storage systems cannot be relied upon to provide significant power on demand, nor can energy storage systems typically aid in voltage regulation, frequency regulation, or power factor regulation.

Figure 2:
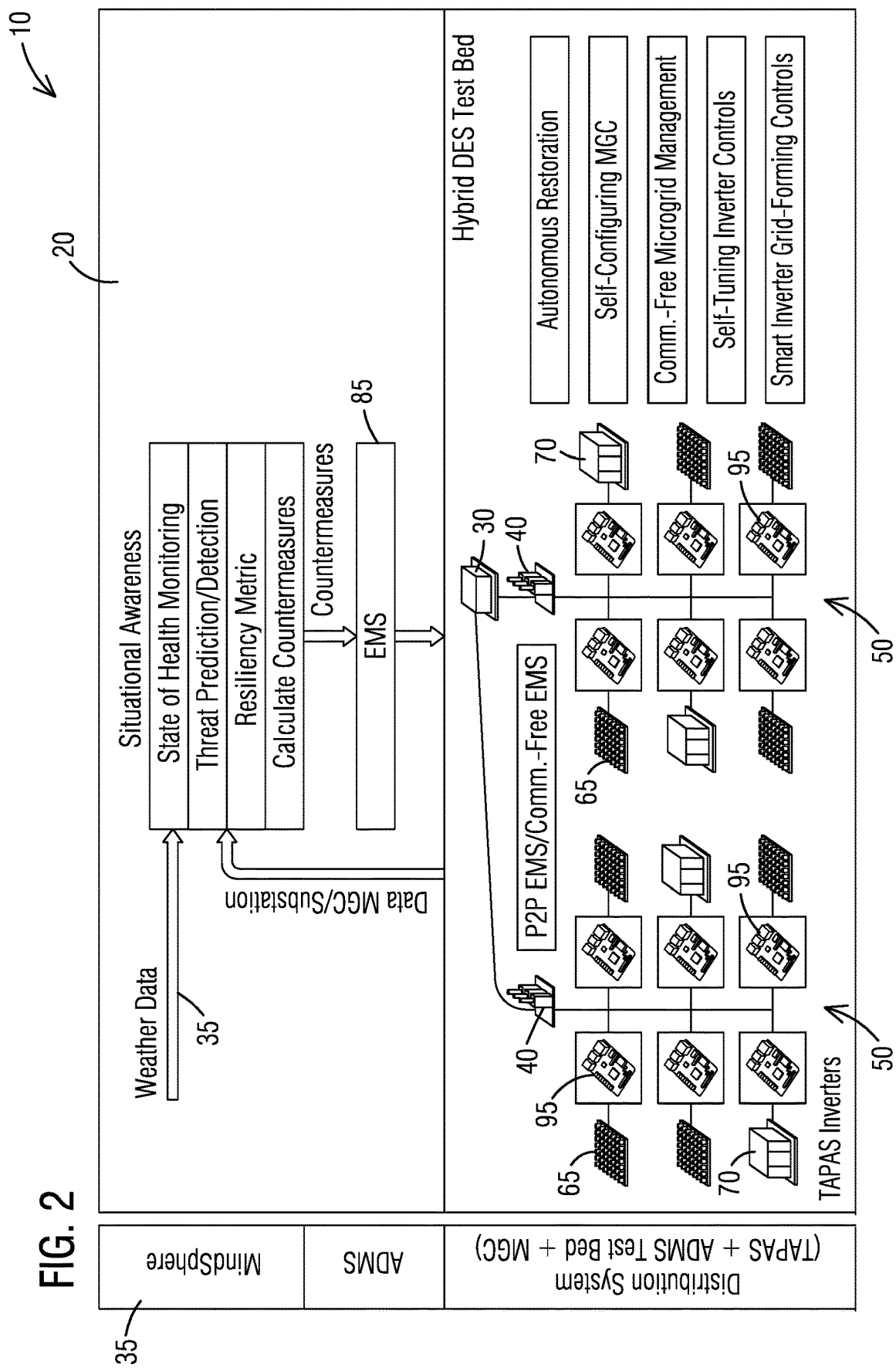
FIG. 2 is a schematic illustration of another power distribution and control system for use with a bulk generation system.

While the increase in DERs causes difficulty in the centralized control system, FIGS. 1 and 2 illustrate systems that takes advantage of the new DERs to increase the resiliency of the overall system. Part of the increase in resiliency results from locating power generation close to the loads in order to avoid outages caused by damaged power lines. The increase of DERs perfectly supports power system resiliency if the DERS are properly managed to avoid power outages and restore the system quickly after outages.

FIG. 1 illustrates a power generation control system 10 that connects to, or works with the existing centralized power generation system to provide a resilient and situationally aware control system. The control system 10 includes a first layer of protection 15 that includes a high-level controller 20 that collects and analyzes data from a number of sources including existing bulk generation facilities 25, substations 30, external sources 35, and any microgrid controllers 40 within the system 10. In FIG. 2, the high-level controller 20, sometimes referred to as a Microgrid Management System (MGMS) 20 is shown receiving data from an external data source 35 such as MINDSPHERE and also communicating with and controlling or coordinating the substation 30 as well as any microgrid controllers 40. The data from the external database 35 may include weather predictions, past damage statistics from known storms, known system weaknesses, and the like. The high-level controller 20 monitors the state of health of all the components that communicate with it and uses the data and the state of health to predict or detect potential failures. The high-level controller 20 can calculate and implement countermeasures based on the aforementioned calculations to minimize the damage or disruption to power users for a given event. The high-level controller coordinates the operation of the other controllers during normal system operation (i.e., operation without any significant contingencies or failures).

Returning to FIG. 1, a second level of protection 45 contains the bulk generation 25, several microgrids 50, and could include substations 30 that direct power to customers but that are not necessarily part of a microgrid 50. More specifically, the second level of protection 45 encompasses and protects the controllers or control systems for the bulk generation facilities, the microgrids 50, and any substations 30 and facilitates or protects communication therebetween.

Each microgrid 50 defines a third level of protection 55. As illustrated in FIGS. 1 and 2, each microgrid 50 includes a separate microgrid controller 40 that controls the components of that microgrid 50. Components in each microgrid 50 can include one or more DERs 60, and one or more loads 64. Each microgrid controller 40 includes a DERs management system that controls and optimizes operation of the DERs 60 to achieve high availability and resiliency of the power supply. Examples for DERs 60 include photovoltaic (PV) systems 65, battery energy storage systems (BESS) 70, wind turbines (WT) 75, diesel/gas generators (DG), and building management systems (BMS) 80.

Each MGC 40 may be located at the transformer that connects the microgrid 50 to the higher voltage level (typical medium voltage). All power exchange between the microgrid 50 and the higher voltage level grid goes through this transformer. This transformer is also called the point of common coupling (PCC) of the microgrid 50. The MGC 40 may manage the generation and load within the microgrid 50, e.g. by curtailing PV infeed, controlling the charging and discharging of the BESS 70, as well as the demand of the BMS 80. This "control" may also be indirect, e.g. through price signals, if the PV, BESS, BMS are owned by separate legal entities. The MGC 40 can control the microgrid 50 both in grid-connected and off-grid scenarios.

The MGCs 40 may be coordinated by an energy management system (EMS) 85 that is part of the high-level controller 20 or is separate as illustrated in FIG. 2. Beyond typical EMS functions like state estimation and power flow control, the EMS/MGC may include special situational awareness functions as part of a technical solution. These situational awareness functions can support power system operators to provide strong protection again physical and cyber threats.

The first layer of security supports the MGMS 20 to assess the power system's resiliency with appropriate metrics, suggests preemptive measures to increase the resiliency prior to anticipated physical threats like natural disasters, and detects, localizes, and finds the root cause of any cyberattacks.

Assessment of the power system's resiliency can include the use of suitable resiliency metrics that quantify the number of critical loads that can be supplied under different threat scenarios. To calculate these resiliency metrics, each MGC 40 first compares the critical loads to local generation within its microgrid 50 and communicates this data to the MGMS 20. Then, the MGMS 20 calculates possible power transfers between microgrids 50 with excess of generation and microgrids 50 with lack of generation for certain threat scenarios. These calculations consider power flow constraints and various cyber and physical threats to the system 10. Finally, the resiliency to different threat scenarios is determined by the number of critical loads that can be supplied under these scenarios.

Each MGC 40 should continuously estimate the amount of local generation within its microgrid 50. This generation estimation considers, the state-of-charge of batteries, the availability of diesel, wind, or other generators, and short-term PV forecasts. The MGC 40 can use long-term and short-term PV forecasting to achieve solar situational awareness. Long-term PV forecasting based on meteorological forecasts uses long range forecasts to estimate the amount of generation that may be possible during that long-term period (e.g., 1-14 days). Short-term PV forecasting is based on cloud coverage and solar irradiance calculations within a short time horizon (e.g., 15 minutes), using all-sky imagers 90. Short-term forecasting (under 30 minutes) based on sky imagers 90 is much more accurate than those based on meteorological data and satellite imagery which is more typically used for long-term forecasting. The underlying algorithms are usually based on image sequence analytics. The all-sky imagers 90 are co-located with individual utility/commercial scale PV systems 65 to forecast their infeed. This feature can also be extended to PV forecasting for multiple commercial and/or residential PV systems 65 in one microgrid 50 with only one all-sky imager 90. However, the use of a single imager 90 reduces the quality of the calculations because the imager 90 and the PV systems 65 are not co-located, and the different PV systems 65 are more geographically distributed. To gather more accurate data, several all-sky imagers 90 and pyranometers can be deployed around the PV systems 65 to acquire sky images continuously or every few seconds during daytime. The sensor (e.g., imager, camera, pyranometer, etc.) position and the sun location are calibrated, and a baseline algorithm is used to segment the clouds and to estimate cloud velocity. The probability of cloud coverage of the sun is calculated based on the sun position and the cloud motion. The coverage probability is then combined with a clear sky index for each PV system 65 to obtain the solar irradiance forecasting.

The first layer of security 15 supports or uses the MGMS 20 to determine and suggest preemptive measures that may increase the resiliency of the power system 10 prior to any anticipated physical threats. The suggested measures are based on probabilities about which components (power lines, generators, microgrids 50, DERs 60, etc.) might fail because of a physical threat. These probabilities can be derived using environmental information like meteorological, wildfire, or earthquake data. The probabilities are then used to calculate a redispatch with special constraints on these vulnerable components. For example, if a power line may fail because of a wildfire, the algorithm will calculate a redispatch to minimize the power flow on this line. These measures will minimize the impact of an outage of these components and thereby increase the resiliency of the power system 10. This redispatch will also take into account information about the distribution of local generation and critical loads within the microgrids 50 from the PV forecasting.

The first layer of security 15 also detects, localizes, and determines the root cause of cyberattacks using data analytics algorithms to identify complex events within the power system 10 to provide explainable results for detected events. This solution combines model-based and data-driven methods into one unified security analytics framework for baseline modeling and anomaly detection, ontological knowledge fusion and extraction, and provenance generation. The knowledge base for this analysis is constructed and maintained over fast cyber-physical data streams. The heterogeneous knowledge base consists of critical events and signal entities and their semantic relations.

Baseline modeling and anomaly detection for measurement devices, control centers, and communication systems combines machine learning algorithms and power flow models. The objective of power flow modeling is to provide situational awareness by identifying the area under attack and to estimate the set of failed lines using only some of the voltage measurements outside of affected areas as well as some side information. Since the power system 10 is not completely observable, power systems state estimation is used to find the best estimate of the voltage phasors at all the buses and phases of the network from a subset of (possibly noisy) measurements. The algorithms extrapolate the current missing (or false) localized data using the data from past measurements, and the surrounding streaming data.

A number of anomaly detection algorithms, such as local outlier factors, one-class support vector machines, and deep neural network are used to detect and classify anomalies. In addition, a class of online event and signal detection approaches that combine real-time stream learning and incremental query processing to extract and fuse values from weather, SCADA systems, Phasor Measurement Units (PMU), PV forecasting, etc., can detect causality relationships between events in real time.

Ontological knowledge fusion and extraction can be implemented with a class of online knowledge-graph fact-checking approaches that exploit context patterns to identify complex relationships. The system performs this by proposing temporal dependency modeled as a set of temporal association rules. This step detects the complex events which combine the side information with the cyber-power incidents. For example, hurricanes have a significant impact on the telecommunications infrastructure, due to both failures of telecommunications equipment and severe power outages. Hence, there is a vast amount of sensor data available at other networked systems that have geographical, physical, and/or logical correlation with the power network. The dependencies between the systems can be learned by subgraph pattern mining algorithms or provided by domain experts. Eventually, such patterns will be standardized and stored as association rules in the knowledge base system. In general, this step provides context-rich information for analytical results and temporal association rules validate a complex graph fact which can be further utilized as root cause analysis.

During normal operation, the MGMS 20 operates as just described. At the same time, each MGC 40 may operate to estimate the state of health (SOH) of its associated microgrid 50. The state of health estimation can include evaluating if the MGC 40 can communicate with the DERs 60 and if the DERs 60 follow the MGC's commands. As an example, the MGC 40 can curtail the PV infeed and evaluate if the PV systems 65 actually curtail their infeed by estimating the PV and load in the microgrid 50 using imagers 90 such as fisheye cameras to estimate the maximal PV infeed.

Each MGC 40 also estimates and predicts the capability of its respective microgrid 50 to supply its local loads 64 and to provide services (provide power to critical loads, grid-forming capabilities such as voltage regulation and frequency control, etc.) to other microgrids 50 in case of a power outage, based at least in part on the state of charge (SOC) of the batteries, the ability of the inverters to provide grid-forming capabilities, and the amount of non-critical load that could be shed.

Situational awareness functions in the energy management system 85 or the high-level controller 20 may estimate the state of health of the overall system 10 by collecting the state of health of all the connected MGCs 40. Moreover, situational awareness may use additional measurement data, e.g. from phasor measurement units, to detect physical or cyber contingencies.

Situational awareness functions can predict the resiliency of the power system 10 to physical and cyber threats by combining the expected/predicted capability of each microgrid 50 obtained from the respective MGCs 40, weather forecasts, and additional measurements.

The resiliency of the power system 10 can be quantified in a number of ways including but not limited to being quantified by the percentage of critical/non-critical loads 64 that cannot be supplied after predefined contingencies.

Situational awareness functions can also calculate countermeasures to increase the resiliency of the power system 10. For example, in case of predictable contingencies such as wildfires or hurricanes, situational awareness functions may maximize the local supply of critical loads within each microgrid 50.

During a contingency event such as a storm, wildfire, cyberattack or the like, it is possible that damage or disruption will occur between the high-level controller 20 and the MGCs 40. Under these conditions, the second layer of protection 45 takes over. Under these conditions, situational awareness functions can identify power resource availability after contingency, can calculate resiliency metric based on the current recovery progress of the power grid, and/or can provide supporting functions to grid operators to reconnect different microgrids 50.

In addition, a peer-to-peer energy management system between the MGCs 40 may be established with distributed primary/secondary/tertiary control and distributed optimal power flow. This energy management system may include distributed allocation of primary energy reserves, distributed secondary control of voltage and frequency, and distributed optimal power flow by only exchanging information with neighboring MGCs 40.

The peer-to-peer energy management system becomes responsible for managing and optimizing the different MGCs 40 and DERs 60 in real time when limited communication is available, especially during the periods of failures and blackouts, whereby the central communication to the MGMS 20 is not available. In particular, it will be operated whenever the communication capabilities between the neighboring MGCs 40 is available or restored (i.e., peer-to-peer communication is available), but the communication with the MGMS 20 is not. The peer-to-peer energy management system will supply loads 64 using a more optimal grid-cognizant management, when compared to the completely communication-free EMS or high-level controller

20. The peer-to-peer energy management system is based on formulating a centralized optimal power flow problem and using distributed optimization methods to distribute the computation among the MGCs 40. This approach requires broadcast communication to coordinate the MGCs 40 to achieve certain network-wide objectives like voltage regulation, line congestion management, frequency control and the like.

In some cases, the contingency event also disrupts communication between the nearby MGCs 40. In this case, the third level of protection 55 is enacted and a communication-free energy management system at each MGC 40 is established. Each MGC 40 will supply power to critical loads within its respective microgrid 50 in case of an outage of the communication system. This is a particularly challenging task on large-scale power systems. Communication-free energy management is based on local secondary controllers implemented in the DERs 60 of the microgrids 50 and in any available bulk generators 25. These secondary controllers restore and maintain the nominal frequency continuously after load or generation changes. The communication-free energy management system addresses frequency restoration and control, voltage control, and reactive power control as well as communication-free dispatch.

The third level of protection 55 also provides for the ability to restart a microgrid 50. In case of a major loss of assets, (e.g. power lines, transformers, generators), a power outage can be expected. In this case, the microgrids 50 are step-by-step autonomously restored without the need for a human operator in the loop.

Autonomous microgrid restoration uses an inverter-driven blackstart technology that makes use of a fleet of DER inverters 95 (shown in FIG. 2) with grid-forming inverter control functions. Moreover, autonomous microgrid restoration includes a communication-free microgrid control if the communication is down. As soon as communication is restored, autonomous microgrid restoration uses self-configuring MGC functions to supply as many loads 64 as possible within the microgrid 50.

The goal of inverter-driven blackstart is to start a distribution feeder dominated by DERs 60 autonomously, namely without human intervention, and collectively leveraging a fleet of inverters, without the need for a large system resource such as a centralized generation station 25.

Distributed grid-forming inverter control is a key component for autonomous microgrid restoration. These control functions enable inverters 95 to act as a controlled voltage source that adapts its power output depending on grid requirements. Moreover, it is controlled to contribute to the stability of the grid. The most common approaches focus on droop control mimicking synchronous machines or Lienard-type oscillators.

Virtual oscillator control for grid-connected inverters 95 are an alternative to standard droop control in terms of dynamic performance including synchronization and load sharing between multiple inverters 95. More advanced, dispatchable oscillator-based controls include dispatchability and backward compatibility with droop control with superior dynamic response. Parallel grid-forming with droop control is very robust with an appropriate tuning of the inverter controllers.

The inverters 95 in each microgrid 50 include advanced distributed inverter control functions for distributed grid-forming with multiple DER inverters 95 able to supply loads 64 which are much larger than any of the inverters 95. The inverters 95 can withstand contingencies, such as loss of one or multiple inverters 95. To achieve this, oscillator-based algorithms for power inverters 95 can account for realistic grid operating conditions including generation-side transients, adding/subtracting inverter-interfaced resources and network-side transients, load transients, and closing/opening of feeder switches to change the grid configurations, the dynamics of the DC side of the inverter 95 considering the type of sources, and interaction with energy storage units.

In order to supply more loads 64 during the outage, coordination and optimization of the DERs 60 in the microgrid 50 is required. If the communication between the DERs 60 is down, communication-free microgrid control between the DERs 60 is used for coordination.

In this situation, one focus of automatic microgrid restoration is to supply relevant nodes with communication capabilities, e.g. Wi-Fi hot spots or UMTS antennas. If the communication is restored, a central coordination by the MGC 40 will increase the efficiency of the microgrid 50. Yet, several components of the microgrid 50, like power lines or generators, might not be functional anymore because of the contingency that caused the outage. Each DER 60 can send a suitable description of its capabilities like maximum power, maximum state of charge, grid-forming capabilities, etc. to the MGC 40 and the MGC 40 can re-configure its control functions based on this input. The MGC 40 can include specialized re-configurable control functions like secondary frequency and voltage control and tertiary control if desired. These functions will extend standard MGC functions in a way that allows them to be re-configured for different assets during operation.

The system 10 of FIGS. 1 and 2 provides a combination of different technologies (peer-to-peer energy management system, communication-free energy management system, autonomous restoration, self-configuration of energy management system, data-driven cyber-attack detection, etc.) in a joint framework to achieve a resilient energy management system.

A situational awareness is provided, and the resiliency of the power system 10 in view of physical and cyber threats may be predicted. Countermeasures are calculated to increase the resiliency. Continuity of service is provided in the cases of loss of a control center, loss of communication between the high-level controller 20 or energy management system 70 and the MGCs 40, and/or a power outage.

Situational awareness of the distribution system utilizes data-driven approaches to take into account weather forecast and real-time sensor data. It also uses model-based measures for resiliency metric calculations.

A peer-to-peer EMS system may provide a backup solution when the MGMS 20, or communication with the MGMS 20 is lost, by exploiting distributed control and optimization techniques to design primary/secondary/tertiary control gains online.

A communication-free energy management system is available in case of loss of communication and an autonomous black start and self-configuration of the MGC 40 is provided in case of an outage.

FIG. 1 illustrates the first level of protection 15 as the outermost box surrounding the entire system 10. Within that box, the MGMS 20 connects to a first communication network 100 to facilitate the receipt of external data from external sources 35 such as MINDSPHERE, (a cloud-based database provided by SIEMENS, AG) and to communicate with bulk generation facilities 25, substations 30, and MGCs 40 to fully and efficiently control these components and the overall system as described above.

The second level of protection 45, illustrated as a smaller square which omits the MGMS 20 includes the bulk generation facilities 25, any substations 30, and the microgrids 50. During a contingency in which the second level of protection 45 is activated, communication to the MGMS 20 is unavailable but a second communication network 105 in the form of peer-to-peer communication between the MGCs 40, substations 30, and bulk generation facilities 25 is available as discussed above.

The third level of protection 55 is represented by several smaller rectangles within the second level of protection 45 and is activated in response to a contingency that disables peer-to-peer communication 105. In this mode of operation, each microgrid 50 is controlled by its MGC 40 as discussed above. Communication within the microgrid 50 (i.e., between the MGC 40 and one or more components of the microgrid 50) is available via one of a plurality of third communication networks 110, each disposed within one of the microgrids 50.

FIG. 2 schematically illustrates different details of the system 10 of FIG. 1 with a slightly different arrangement. A first rectangle represents the MGMS 20 and includes an EMS 70 therein. Data from the MGCs 40 and substations 30 is fed into the MGMS 20 along with external data, such as weather data from an external source 35 such as MIND-SPHERE.

A second area of FIG. 2 illustrates a portion of the grid including a substation 30 and two microgrids 50. In this arrangement, the substation 30 distributes power to each of the microgrids 50. However, other arrangements may include substations 30 at the same level as the microgrids 50.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A power distribution and control system for use with a bulk generation system having transmission and distribution systems, the power distribution and control system comprising:
    a plurality of microgrids each including a power generation element and a load;
    a plurality of microgrid controllers each associated with one and only one of the plurality of microgrids;
    a first communication network;
    a high-level controller operable using the first communication network to communicate with the bulk generation system and each of the plurality of microgrid controllers, the high-level controller operable to coordinate the operation of the microgrids during normal system operation;
    a second communication network separate from the first communication network, the second communication network providing peer to peer communication between each of the plurality of microgrid controllers when at least one of the high-level controller and the first communication network is not available; and
    a plurality of third communication networks, each third communication network providing communication between one of the plurality of microgrid controllers and at least one of the power generation element and the load associated with that microgrid controller,
    each third communication network being configured to be activated in response to disablement of the peer-to-peer communication provided by the second communication network.

2. The power distribution and control system of claim 1, wherein each microgrid includes a photovoltaic element and an energy storage element.

3. The power distribution and control system of claim 2, wherein each microgrid controller uses the third communication network to monitor the state of health of at least one of the associated power generation element, the load, the photovoltaic element, and the energy storage element.

4. The power distribution and control system of claim 2, further comprising a sky imager operable to determine a short-term forecast of a local cloud cover.

5. The power distribution and control system of claim 4, wherein the forecast of local cloud cover is transmitted to one of the microgrid controllers and wherein the microgrid controller estimates a quantity of power generation from its associated photovoltaic element.

6. The power distribution and control system of claim 1, wherein a first of the plurality of microgrids includes a plurality of loads, and wherein one of those loads is designated as a critical load.

7. The power distribution and control system of claim 6, wherein the microgrid controller associated with the first microgrid operates to assure that power is delivered first to the critical load.

8. The power distribution and control system of claim 1, wherein the first of the plurality of microgrids includes an inverter, and wherein the inverter includes an inverter control that controls an inverter output voltage.

9. The power distribution and control system of claim 8, wherein the inverter control includes a grid-forming control for grid-connected inverters that provides for synchronization to a grid and load sharing.

10. The power distribution and control system of claim 1, further comprising an external database containing at least weather data, the external database accessible by the high-level controller via the first communication network.

11. The power distribution and control system of claim 10, wherein the high-level controller utilizes historical data to at least partially control the operation of each of the plurality of microgrid controllers.

* * * * *